United States Patent [19]

Doppstadt

[11] Patent Number: 5,480,098
[45] Date of Patent: Jan. 2, 1996

[54] MOBILE MATERIAL PROCESSING MACHINE WITH TANDEM AXLE

[76] Inventor: Werner Doppstadt, Vossnacker Strasse 67, 42555 Velbert, Germany

[21] Appl. No.: 215,326

[22] Filed: Mar. 21, 1994

[30] Foreign Application Priority Data

Apr. 10, 1993 [DE] Germany ............................ 9305445 U

[51] Int. Cl.⁶ .............................. B02C 9/04; B62D 53/00
[52] U.S. Cl. .................. 241/101.76; 180/209; 280/149.2
[58] Field of Search ........................ 180/209; 241/101.7; 280/149.2, 405.1, 406.1, 406.2, 407, 407.1

[56] References Cited

U.S. PATENT DOCUMENTS

| | | | |
|---|---|---|---|
| 2,900,194 | 8/1959 | De Lay | 280/149.2 X |
| 3,126,209 | 3/1964 | Jewell et al. | 280/149.2 X |
| 3,365,211 | 1/1968 | Ginsberg | 280/149.2 X |
| 3,618,969 | 11/1971 | Glassmeyer | 280/149.2 |
| 4,531,753 | 7/1985 | Hicks | 280/149.2 |
| 4,852,816 | 8/1989 | Doppstadt | |
| 4,927,528 | 5/1990 | Doppstadt | |
| 5,221,103 | 6/1993 | Ehrlich | 280/149.2 X |
| 5,314,201 | 5/1994 | Wessels | 280/149.2 X |
| 5,346,233 | 9/1994 | Moser | 280/149.2 |

FOREIGN PATENT DOCUMENTS 1614825  12/1990  U.S.S.R. .................. 180/209

OTHER PUBLICATIONS

Brochure for SAF Axles and Suspensions manufactured by Otto Sauer Achsenfabrik Keilberg.

*Primary Examiner*—Timothy V. Eley
*Attorney, Agent, or Firm*—Collard & Roe

[57] ABSTRACT

The mobile material processing machine contains a support frame and a wheel-supported tandem axle. The tandem axle and the support frame are interconnected in a lengthwisely adjustable manner relative to each other. The load effective at a towing vehicle is thus maintained in the event of a shift in the center of gravity of the mobile material processing machine due to equipment changes.

17 Claims, 5 Drawing Sheets

MOBILE MATERIAL PROCESSING MACHINE WITH TANDEM AXLE

BACKGROUND OF THE INVENTION

The present invention relates to a new and improved construction of a mobile material processing machine.

In its more particular aspects, the invention relates to a new and improved construction of a mobile material processing machine comprising a support frame supporting the material processing machine and supported, in turn, on wheels such that the material processing machine can be moved to different working locations and/or displaced to different positions at a given working location during a material processing operation.

A material processing machine like, for example, a sieve device such as known, for example, from U.S. Pat. No. 4,927,528, granted May 22, 1990, to the applicant of the instant application, is provided with a support frame supporting the sieve device and supported, in turn, on wheels. For displacement at a particular working location and for travel between different working locations, a coupling device is provided at a front end of the support frame for engagement with a towing vehicle such as a tractor or truck or the like.

A further mobile material processing machine such as known, for example, from U.S. Pat. No. 4,852,816, granted Aug. 1, 1989, to the applicant of the instant application, comprises a shredder supported at a support frame or chassis which, in turn, is supported on wheels fixedly attached to the support frame near the rear end thereof. Removable supports are provided for resting the front end of the support frame at a working location during operation of the shredder. The front end is also provided with a drawbar and coupling means. The coupling means can be engaged by a shovel loader, which is used to feed the material to be processed to the shredder, in order to slightly lift the front end and, then, displace the shredder to a different position at the particular working location. For travel to different working locations, the supports are removed and the coupling means are engaged with a towing vehicle such as a tractor or truck or the like.

The shredder of the aforementioned type has been further modified so as to enable remote control of the displacement of the shredder at a given working location. To this end, a shredder is supported by two pairs of wheels and the front pair of wheels, as viewed in the displacement direction of the shredder, is provided with hydraulic drive means. The hydraulic drive means include drive rolls and engagement means for engaging the drive rolls and the associated front wheels. The drive rolls are drivingly connected with a hydraulic motor through gear means; the hydraulic motor is controlled by hydraulic control means which, in turn, are under remote control so that the displacement of the shredder at a given working location can be controlled by the operator of the shovel loader utilized for charging the shredder. In this manner, a one-man operation of the shredder is ensured.

The aforementioned modified shredder may contain a tandem axle for movably supporting the same. Such tandem axle comprises a pair of axles series arranged relatively close to each other as compared to the total length of the support frame. Usually, the tandem axle is located rearwardly of the center of gravity of the support frame as viewed in the travelling direction so as to ensure that the required minimum load of 10,000 Newton is effective at a towing vehicle such as a tractor or truck used for moving the mobile machine between different locations. It is thereby ensured that the support frame can not tilt to the rear and thus undesirably reduce the road adherence of the towing vehicle such as a tractor or truck or the like.

The support frame of the aforementioned mobile material processing machines carries standard equipment of machine elements but may be provided with various additional machine elements depending on the type of employment and the type of material to be processed at the various possible working locations. As a consequence of such structural change, the center of gravity varies as a function of the particular equipment supported at the support frame with the result of a variation in the load which becomes effective at the towing vehicle.

SUMMARY OF THE INVENTION

Therefore, with the foregoing in mind, it is a primary object of the present invention to provide a new and improved construction of a mobile material processing machine which is not afflicted with the drawbacks and limitations of the prior art heretofore discussed.

Another and more specific object of the present invention is directed to the provision of a new and improved construction of a mobile material processing machine in which the load effective at the towing vehicle is adjustable to the desired value independent of the particular machine elements supported at the support frame of the mobile material processing machine.

A further and important object of the present invention is directed to the provision of a new and improved construction of a mobile material processing machine which is supported at a tandem axle in a manner such that the load effective at the towing vehicle can be maintained at the desired value.

It is a further significant object of the invention to provide a new and improved construction of a mobile material processing machine which is supported at a tandem axle and which is displaceable independent of a towing vehicle.

Another important object of the invention is directed to the provision of a new and improved construction of a mobile material processing machine having a tandem axle and incorporating displacing means for displacing the mobile material processing machine.

Now, in order to implement these and still further objects of the invention, which will become more readily apparent as the description proceeds, the mobile material processing machine of the present development is manifested by the features that, among other things, an undercarriage carrying a wheel-supported tandem axle is provided and connected to the support frame using connecting means which permit adjusting the support frame and the undercarriage relative to each other in the lengthwise direction thereof.

During a given operation of the mobile material processing machine, the support frame supports a particular machine for performing a specific work at a given working location and the undercarriage carrying the tandem axle assumes a position with respect to the support frame such that the desired minimum load becomes effective at the towing vehicle. Upon changing or adding machine elements, the center of gravity may shift, for example, to the rear and, as a consequence, the load effective at the towing vehicle may become less than the required minimum load. In such case, the connecting means connecting the support frame and the undercarriage permit placing the undercarriage into a more rearward position at the support frame. As a result, the load which is effective at the towing vehicle, is increased by the desired amount to or above the required minimum load, as the case may be, because there is effected an increase in the mass which acts on the tandem axle on the side of the towing vehicle.

BRIEF DESCRIPTION OF THE DRAWINGS

The invention will be better understood and objects other than those set forth above will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENTS

Describing now the drawings, it is to be understood that only enough of the construction of the mobile material processing machine has been shown as needed for those skilled in the art to readily understand the underlying principles and concepts of the present development, while simplifying the showing of the drawings. Also, while the illustrated exemplary embodiments specifically relate to mobile waste processing machines, the same or analogous constructional features can be readily utilized generally in connection with mobile processing machines for processing other than waste materials.

Figure 1:
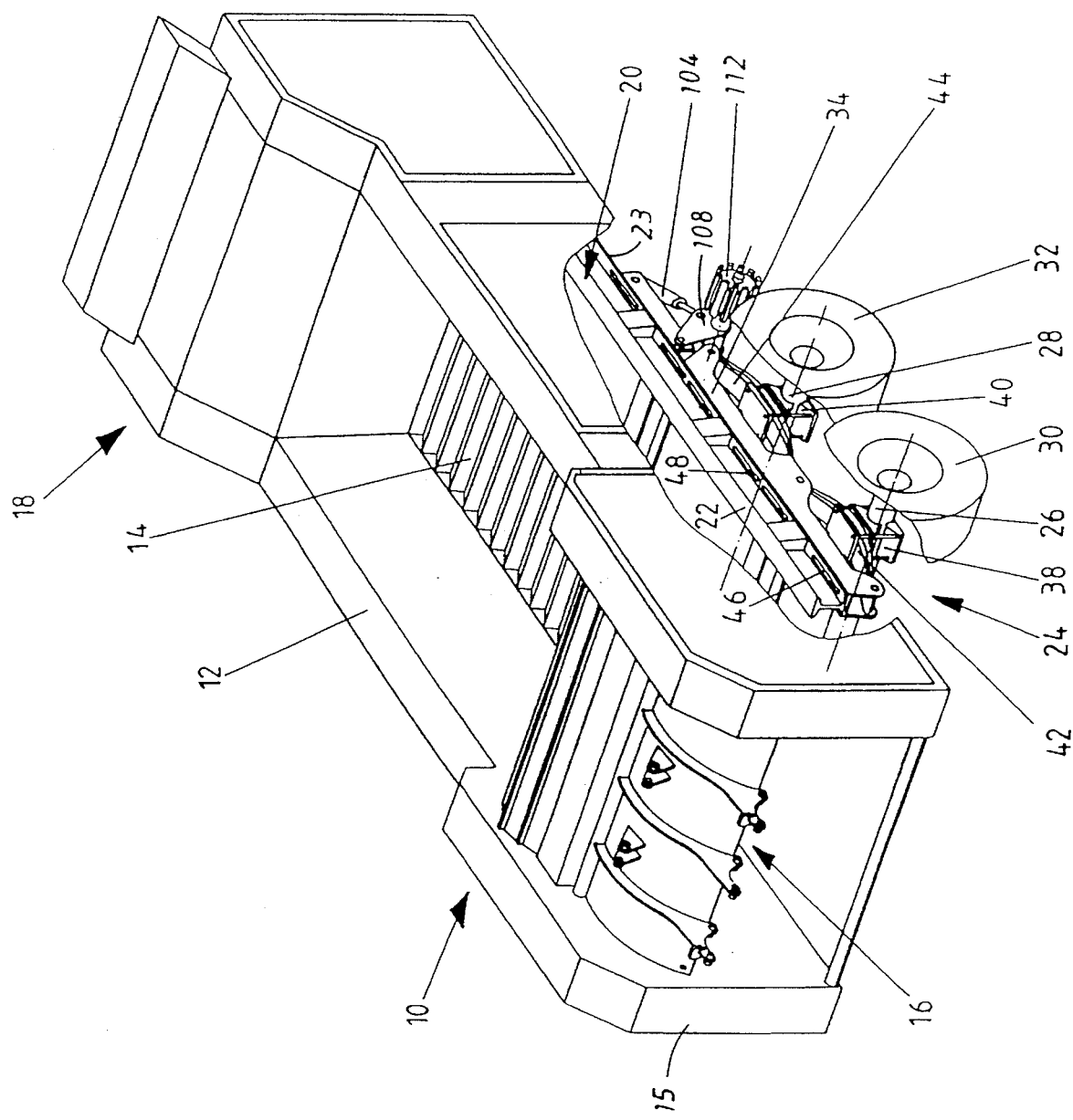
FIG. 1 is a schematic view in perspective of a first exemplary embodiment of the inventive mobile material processing machine in the form of a shredder which is placed on a support frame carried by an undercarriage having a tandem axle and associated drive means.

In the schematic perspective view of a first exemplary embodiment of the inventive mobile material processing machine as illustrated in FIG. 1, the machine constitutes a mobile waste processing machine in the form of a shredder generally designated by the reference numeral 10. The shredder 10 is of the basic type as disclosed in the aforementioned U.S. Pat. No. 4,852,816 and comprises a trough-like container 12. A conveying device 14 constitutes a band conveyor containing transverse ledges and is provided at the bottom of the trough-like container 12. The waste material to be shredded or comminuted like, for example, boughs, branches, pieces of trees etc. is thrown into the container 12, usually by means of a shovel loader or the like. The band conveyor conveys this material to the rear end 15 as viewed in the travelling direction of the mobile waste processing machine. A comminuting mechanism 16 is located at this end so that the comminuted waste material is outfed at this rear end 15 of the waste processing machine and deposited in the form of stacks or pits for composting. A power unit 18 is placed at the opposite front end of the machine.

The mobile waste processing machine or shredder 10 comprises a support frame 20 supporting the aforementioned machine components, namely the trough-like container 12, the conveying device 14, the comminuting mechanism 16 and the power unit 18. Due to the fact that the power unit 18 is located at the front end opposite the comminuting mechanism 16, the power unit 18, in effect, constitutes a counterweight balancing the comparatively heavy comminuting mechanism 16 and counteracting an undesirable unilateral weight distribution at the support frame 20.

In the specifically illustrated exemplary embodiment, the support frame 20 constitutes a steel structure at which the waste processing machine is removably mounted in conventional manner using appropriately selected and disposed, interengaging pegs and bushes. The support frame 20 includes two longitudinally extending members or I-beams 22 which are connected to a wheel-supported undercarriage 24. The undercarriage 24 is supported on wheels 30,32 by means of a tandem axle 26,28. Such tandem axle is of conventional construction containing brake means for arresting the tandem axle at a given location; it is available, for example, from Otto Sauer, Achsenfabrik Keilberg, D-63856 Bessenbach, Germany. The tandem axle contains two axles 26 and 28 which carry respective wheels 30 and 32 and which are arranged at a mutual spacing which is small as compared to the overall length of the support frame 20. The undercarriage 24 includes two lengthwise extending members or beams 34 to which bearings 38 and 40 for rotatably supporting the axles 26 and 28 are respectively attached via respective plate spring assemblies 42 and 44 in conventional manner. The I-beams 22 of the support frame 20 and the beams 34 of the undercarriage 24 face each other in the assembled condition.

Connecting means 46,48 are provided for adjustably interconnecting the I-beams 22 of the support frame 20 and the beams 34 of the undercarriage 24. Such connecting means 46,48 encompass a plural number of elongate holes 46 which are series arranged in the longitudinally extending I-beams 22 in a lower or external flange 23 thereof and extend in the longitudinal direction of the I-beams 22. The connecting means 46,48 further encompass a plural number of clamping bolts 48 which extend through the associated elongate holes 46 and which are associated with through-holes in the lengthwise extending beams 34 of the undercarriage 24. The clamping bolts 48 are secured in conventional manner by means of self-locking nuts.

When additional machine elements are attached to the waste processing machine or shredder 10 in a manner such that the center of gravity is displaced in a direction towards the rear end 15 or the comminuting mechanism 16, the load is reduced which is effective at a towing vehicle such as a tractor or truck or the like. In order to re-establish the desired effective load at the towing vehicle, the brakes of the tandem axle are actuated and the connecting means 46,48 are temporarily released by disengaging the clamping bolts 48 from the lengthwise extending beams 34 of the undercarriage 24. The support frame 20 is connected to the towing vehicle which is, then, driven to displace the support frame 20 relative to the undercarriage 24. This relative movement is permitted due to the blocked or braked condition of the undercarriage 24 and due to the sliding movement of the clamping bolts 48 in the associated elongate holes 46 in the lower or external flanges 23 of the I-beams 22. The displacement is effected by an amount which is sufficient to provide the desired effective load at the towing vehicle.

Upon reaching the desired position of the support frame 20 relative to the undercarriage 24, the clamping bolts 48 are refastened. As a result of the relative displacement, the center of gravity is displaced in a direction to the front end or power unit 18 so that the load effective at the towing vehicle is re-increased to the desired amount.

Figure 2:
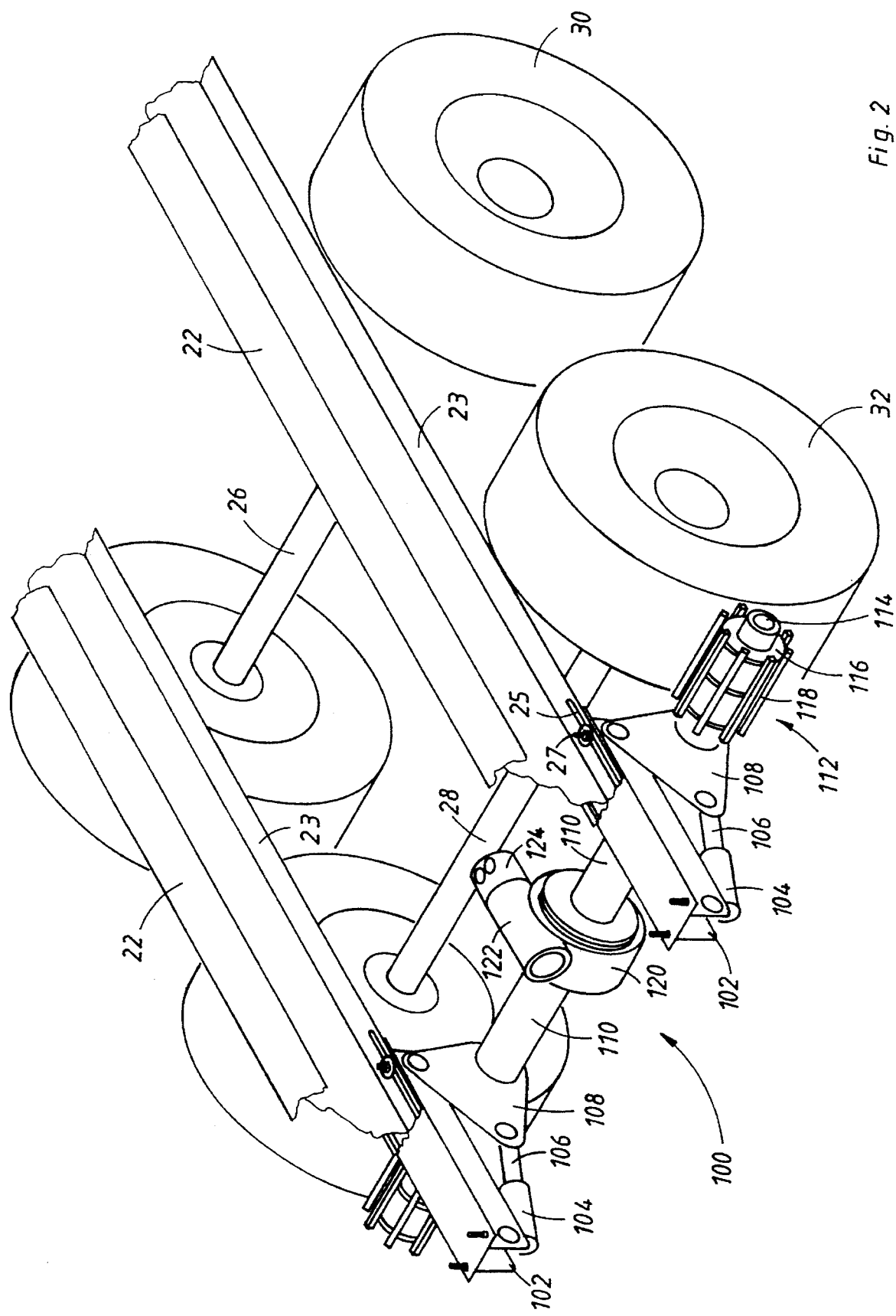
FIG. 2 is a perspective view of the tandem axle and the associated drive means.

As noted in connection with the initially mentioned modified shredder, also the instant mobile shredder can be provided with the known pressure fluid operated drive means like, for example, hydraulic drive means 100 which are arranged to act upon the tandem axle for displacing the support frame 20 inclusive of the waste processing machine or shredder 10. Although the construction of the hydraulic drive means 100 and its control are basically known in the art, the hydraulic drive means are shown and described in detail here for reasons of clarity. As will be recognized from FIG. 2, the axles 26 and 28 with the associated wheels 30 and 32 are connected to the beams 22 of the support frame 20. The undercarriage 24 has been omitted for reasons of clarity. A bracket 102 is lengthwisely adjustably mounted at the lower flange 23 of each one of the I-beams 22 in conventional manner by means of lengthwise slots 25, bolts 27 and conventional self-locking nuts. Each bracket 102 has linked to one end thereof engagement means in the form of the cylinder 104 of a double acting hydraulic piston-cylinder unit 104,106. The free end of a piston 106 thereof is linked to a bell-crank lever 108 which, in turn, is linked to the bracket 102 opposite the one end thereof. Two bell-crank levers 108 are disposed on opposite sides of the support frame 20 and carry respective shafts 110. A drive roll 112 is mounted at the free end of each one of the shafts 110.

The drive roll 112 is made up of a hollow axle 114 which is keyed to the shaft 110 by means of a conventional feather. The hollow axle 114 supports an engagement body 116,118 containing three discs 116 fixed thereto such as by welding. The engagement body 116,118 further contains struts 118 which are connected to the circumference of the discs 110 and extend in the axial direction of the assembly. The discs 116 are disposed at substantially equal axial spacings and the struts 118 are disposed at substantially equal angular spacings around the discs 116. The axial length of the struts 118 corresponds to the width of the tire tread at the wheel 32.

At the end remote from the drive roll 112, each shaft 110 has attached thereto a gear (not shown). The gears are located in a common housing 120 and mesh with a worm gear 122 of which only the enclosure is shown. The worm gear 122 is drivingly connected to a hydraulic motor only schematically indicated and designated by the reference numeral 124.

It will be seen that, upon actuation of the engagement means, i.e. the double acting hydraulic piston-cylinder unit 104,106, the shafts 110 are pivoted about their axes by means of the levers 108 such that the drive rolls are pressed against the tire of the respective wheel 32 at a predetermined contact pressure. As a result, the wheels 32 can be rotated and the entire waste processing machine displaced at its working location upon actuation of the hydraulic motor 124.

Figure 3:
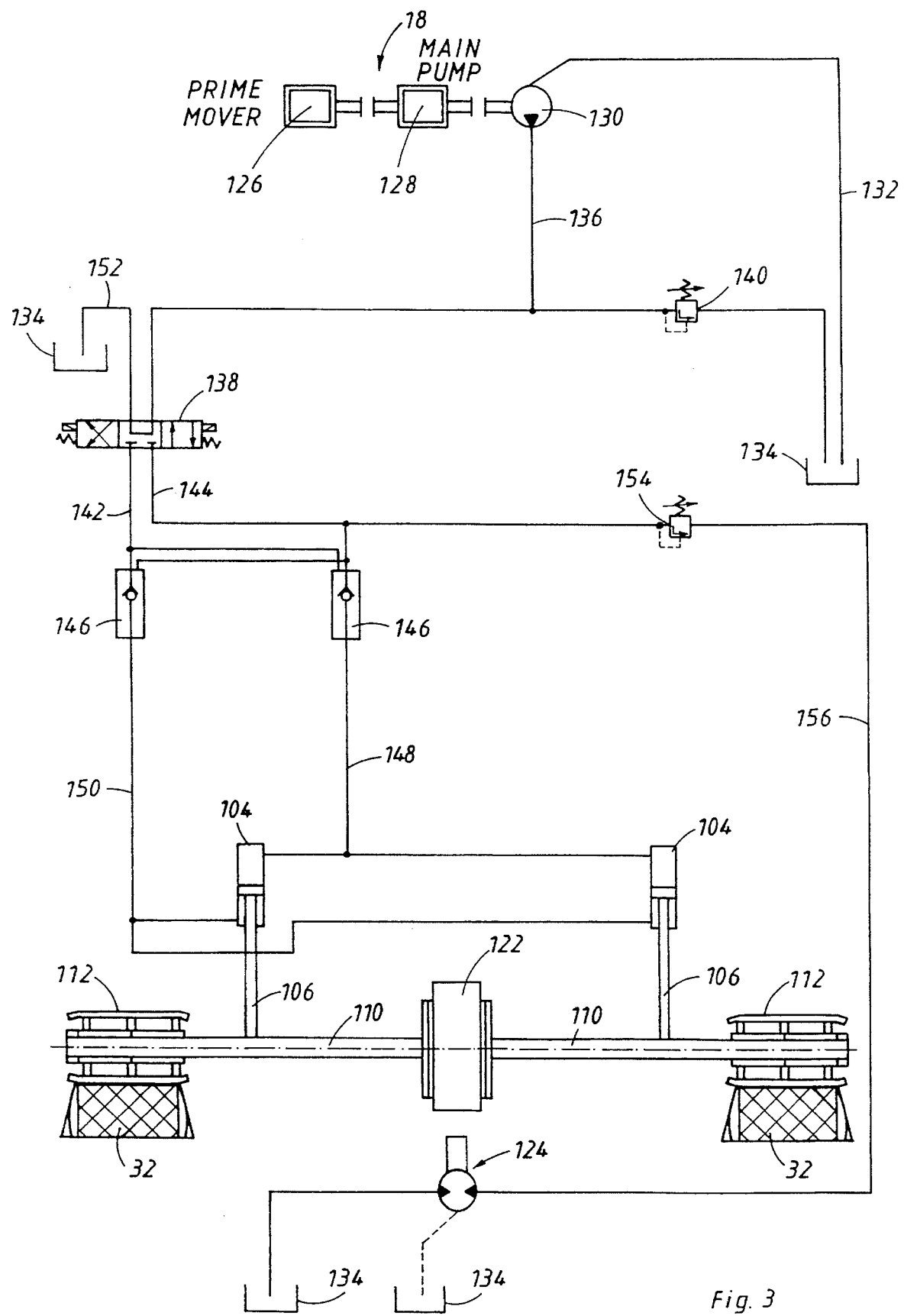
FIG. 3 is a schematic block circuit diagram showing the hydraulic control system between a power unit and the drive means associated with the tandem axle in the mobile material processing machine as shown in FIG. 1.
Figure 4:
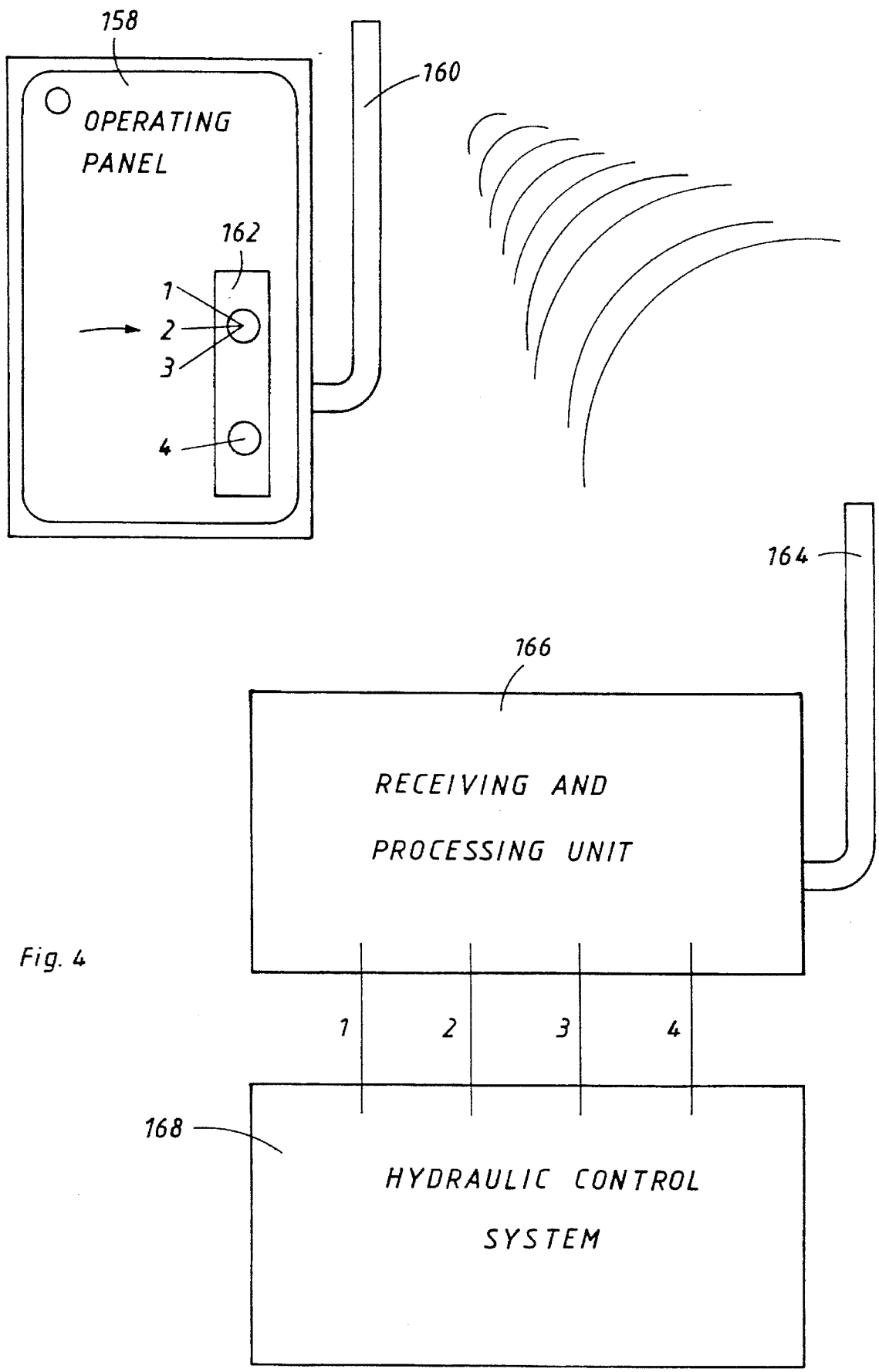
FIG. 4 is a schematic block diagram showing a remote control system used in connection with the hydraulic control system as shown in FIG. 3.

A pressure fluid control means or system is provided, as a matter of example, in the form of a hydraulic control means or system 168 (see FIG. 4) for controlling the hydraulic motor 124 will now be explained with reference to the block circuit diagram of FIG. 3. The herein described mobile material processing machine or shredder 10 is equipped with the power unit 18 which includes in conventional manner a prime mover 126 like, for example, a diesel engine and a hydraulic system supplied by a hydraulic main pump 128 such as, for example, an axial piston pump. The hydraulic main pump 128 is in driven connection with the prime mover or diesel engine 126 and communicates with a hydraulic pump 130 for supplying hydraulic oil to the hydraulic drive means 100. The hydraulic pump 130 is connected through a line or conduit 132 to an oil reservoir 134 on the input side; the output side is connected through a line or conduit 136 to a 4/3-way valve 138 which controls the hydraulic oil supply to the hydraulic drive means 100 and which is provided with a pressure limiting valve 140 communicating with the oil reservoir 134.

In the illustrated first position, the 4/3-way valve 138 is short-circuited to direct the flow of oil to the oil reservoir 134 so that either no pressure is built up in the hydraulic drive means 100 or the pressure prevailing therein is essentially maintained.

In a second position, the 4/3-way valve 138 communicates with a first side of the double-acting hydraulic cylinder 104 through a line or conduit 144, a respective one of check valves 146, and the line or conduit 148. As a result, the respective check valve 146 is opened, a first side of the double acting hydraulic cylinder 104 is pressurized, the pistons 106 are displaced in their cylinders 104, and the bell-crank levers 108 are pivoted so as to apply the drive rolls 112 to the wheels 32 of the undercarriage 24. The oil which is displaced from a second side of the double acting cylinders 104, passes through the line or conduit 150, through the respective open check valve 146, and the line or conduit 142 to the oil reservoir 134. When a predetermined contact pressure, for example, 50 bars is built up between the drive rolls 112 and the wheels 32, the check valves 146 will close.

Since the 4/3-way valve 138 is still open, the pressure prevailing in line or conduit 144 will now further increase until a pressure responsive switch valve 154 opens at, for example, 80 bars and passes hydraulic oil at increased pressure through a line or conduit 156 to the hydraulic motor 124 in order to activate the same for rotating the worm gear 122 and thereby setting the drive rolls 112 into rotation. Due to the now significantly increased contact pressure, there is no slip effective between the drive rolls 112 and the wheels 32 so that the undercarriage 24 and thereby the entire mobile waste processing machine or shredder 10 will be set into motion. It should be noted that, upon first actuation of the hydraulic control system 168, there is some delay before the motion of the undercarriage 24 or the mobile waste processing machine or shredder 10 is started.

When the 4/3-way valve 138 is returned to the first position, the hydraulic control system 168 will remain under pressure and the drive rolls 112 will remain in contact with the wheels 32 under the predetermined contact pressure. However, rotation of the drive rolls 112 will end because the oil flow is stopped and the pressure responsive switch valve 154 is reclosed. Further motion of the undercarriage 24 and the mobile material processing machine is readily restarted practically without delay, when the 4/3-way valve 138 is returned into the aforementioned second position since the pressure responsive switch valve 154 is opened again.

In a third position of the 4/3-way valve 138, the line or conduit 144 is connected with the line or conduit 152 leading to the oil reservoir 134 and the line or conduit 142 is connected to the line or conduit 136. Consequently, the second side of the double acting hydraulic cylinders 104 is pressurized, the check valves 146 are opened and the first side of the double acting hydraulic cylinders 104 is connected to the oil reservoir 134. As a result, the pistons 106 are displaced in the cylinders 104 such that the levers 108 and thereby the shafts 110 are pivoted to release the drive rolls 112 from the wheels 32.

In the presently described embodiment, the worm gear 122 of the hydraulic drive means 100 is in self-locking engagement with the gears on the shafts 110. Consequently, the drive means 100 are not reversible and the drive rolls 112 are driven only in one rotary direction. Specifically, this one rotary direction corresponds to the forward moving direction of the undercarriage 24 and the mobile waste processing machine or shredder 10. Also, in this particular embodiment, the drive rolls 112 are seen to act upon the front wheels 32 of the undercarriage 24. This is a consequence of the fact that the mobile material processing machine or shredder 10 comminutes the infed waste material and deposits the comminuted waste material on the rear in a manner such that stacks or pits are formed in which the comminuted waste material is left to rot. It is for this reason that a rearward movement of the mobile waste processing machine or shredder 10 is not intended and, in fact, undesirable.

Preferably, in order to permit the entire mobile waste processing machine or shredder 10 to be operated by a single operator, such operation is effected by remote control. For this purpose, the operator's cabin in the material feeding shovel loader is provided with a remote control system of the type schematically shown in FIG. 4. The remote control system comprises an operating panel 158 including a transmitter transmitting within an approved high-frequency band by means of a transmitting antenna 160. The transmitting antenna 160 transmits coded signals which are encoded in conventional manner and thereby relate to specific functions which are under remote control in the mobile waste processing machine or shredder 10.

The operating panel 158 contains a plural number of sections of which a section 162 specifically relates to the hydraulic drive means 100. A toggle lever of the section 162 is movable between three positions indicated "1", "2" and "3"; further provided is a push button "4". On the side of the material processing machine or shredder 10, there is provided a receiving antenna 164 for receiving the signals transmitted by the transmitting antenna 160 from the operator cabin of the shovel loader. The receiving antenna 164 is connected to a receiving and processing unit 166 in which the received signals are decoded and otherwise processed and supplied to the hydraulic control system 168 of the hydraulic drive means 100. The interrelationship between the transmitter and receiver is indicated by the lines marked "1", "2", "3" and "4" and designating output signals which relate to the toggle switch positions "1", "2" and "3" and the push button "4" of the operating panel 158. During operation of the remote control system, the output signals of the receiving and processing unit 166 are related to the positions of the 4/3-way valve 138 as follows:

The position "2" corresponds to the first position of the 4/3-way valve 138. This position is the short-circuited position assumed either prior to the start of the machine or in a neutral condition in which the drive rolls 112 are maintained in engagement with the wheels 32 under the predetermined contact pressure but are not set into rotating motion. The position "1" corresponds to the second position of the 4/3-way valve 138 and causes the drive rolls 112 to be actuated so as to displace the waste processing machine or shredder 10 at the working location. The position "3" corresponds to the third position of the 4/3-way valve 138 and serves to pivot the bell-crank levers 108 so as to disengage the drive rolls 112 from the wheels 32. However, this operation will not be started without actuating the push button "4". This is a fail-safe feature intended to prevent accidental and undesired disengagement of the drive rolls 112 from the wheels 32 and thereby undesired free movement of the waste processing machine or shredder 10: this operation can only be started by placing the toggle lever into the position "3" and by operating the push button "4" in this position of the toggle lever. Since the placing the toggle lever into the position "3" or actuating the push button "4" alone will have no effect on the hydraulic drive system 100, it is thereby ensured that the operator can trigger the operation of disengaging the drive rolls 112 only intentionally and not accidentally.

Figure 5:
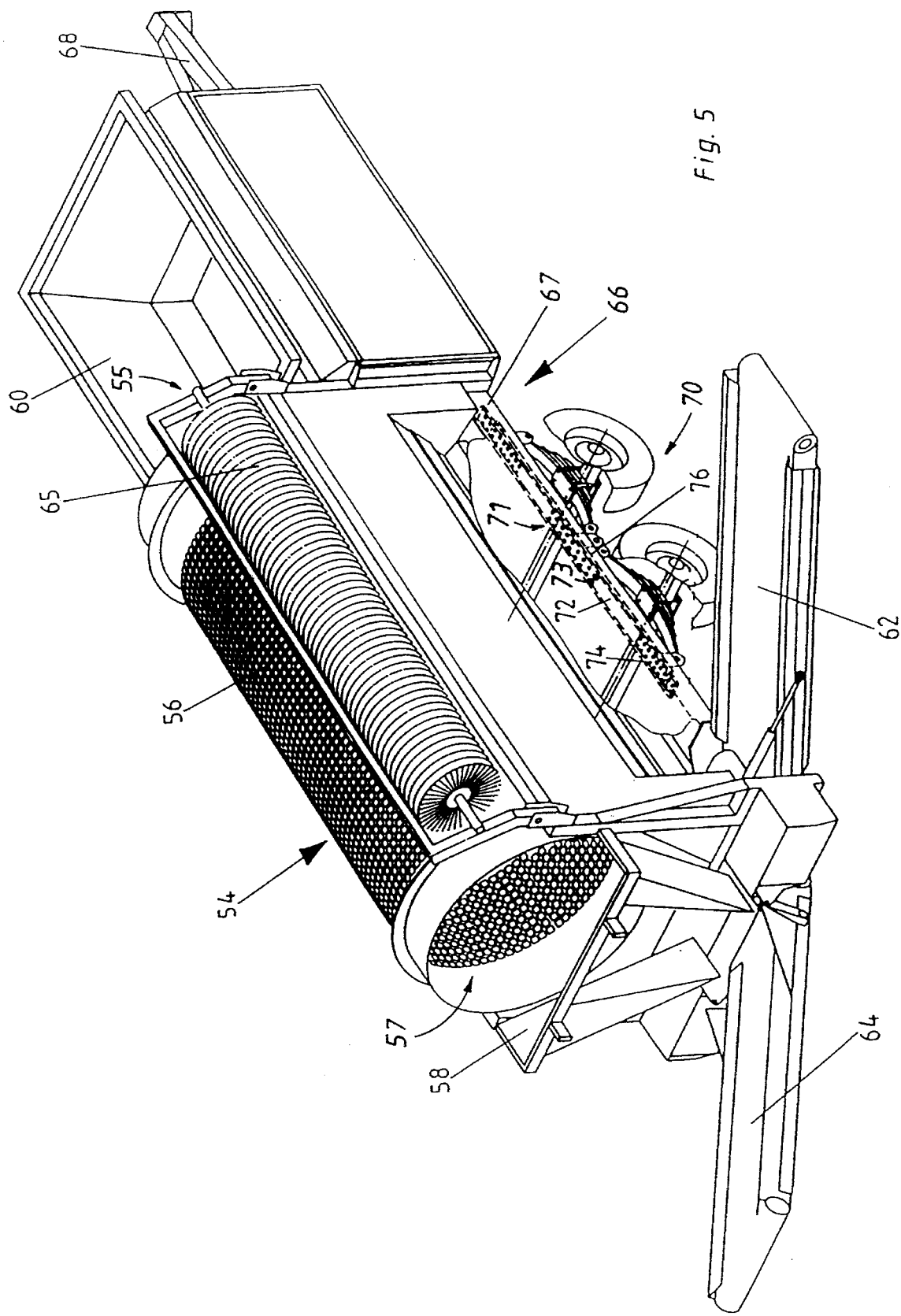
FIG. 5 is a schematic view in perspective of a second exemplary embodiment of the inventive mobile material processing machine in the form of a sieve device having a support frame carried by an undercarriage which is supported at a tandem axle.

FIG. 5 shows a similar view of a second exemplary embodiment of the inventive material processing machine constituting a sieve device 54 having a construction of the basic type as disclosed in the aforementioned U.S. Pat. No. 4,927,528. The sieve device 54 is used, for example, for separating compost material from comminuted waste material. The compost material is present therein after completion of the rotting process proceeding in the comminuted waste material which is deposited in the aforementioned stacks or pits.

The sieve device 54 includes a large sieve drum 56 which is rotatably supported within a framework 58 at rollers which are invisible in FIG. 5. The sieve drum is set into rotation by means of a power unit of the sieve device 54. Such power unit conventionally includes a prime mover such as, for example, a diesel engine, and a hydraulic system for actuating various hydraulically operated parts or elements of the sieve device 54. The power unit preferably is structured and arranged in the manner as disclosed in my copending U.S. patent application Ser. No. 08/215,275, filed Mar. 21, 1994, and entitled "Mobile Machine Containing Displaceably Mounted Power Unit or Power Unit Components".

A feeding hopper 60 is located at an infeed end 55 of the sieve drum 56 and serves for infeeding the material to be separated. A conveying band is arranged above the bottom of the feeding hopper 60 for conveying the infed material into the sieve drum 56. A band conveyor, which is not visible in FIG. 5, runs below the sieve drum 56 and receives the material passing through the perforations of the sieve drum 56 in order to convey the same in a direction away from the infeed hopper 60. Two band conveyors 62 and 64 are located at an outfeed end 57 of the sieve drum 56 for respectively carrying away the material which has passed through the perforations of the sieve drum 56, and the material which remains within the sieve drum 56 and exits at its outfeed end 57 during rotation thereof.

A brush roll designated 65 is arranged such as to interact with the rotating sieve drum 56 for cleaning the same and clearing the perforations thereof.

The sieve drum 56 is supported at a support frame 66 which is part of the sieve device 54 in this embodiment of the inventive mobile material processing machine. The support frame 66 has a drawbar 68 on the side of the infeed hopper 60 and longitudinally extending frame members 67 which are connected to a wheel-supported undercarriage 70 equipped with a tandem axle. The undercarriage 70 is of substantially the same basic construction as the undercarriage 24 described hereinbefore with reference to FIG. 1 of the drawings. Thus, the tandem axle contains two axles at a mutual spacing which is small as compared to the overall length of the support frame 66. The axles carry respective wheels. The undercarriage 70 includes two lengthwise extending beams 76 to which bearings rotatably supporting the axles are respectively attached in conventional manner using respective plate spring assemblies. The frame members 67 of the support frame 66 and the beams 76 of the undercarriage 70 face each other in the assembled condition.

Connecting means 71 are provided for interconnecting the longitudinal frame members 67 of the support frame 66 and the lengthwise extending beams of the undercarriage 70. Such connecting means 71 encompass rectangular, elongated plates 72 which are provided with a plural number of holes 74 arranged in a longitudinal sequence of pairs of holes 74. The connecting means 71 further encompass a plural number of throughholes which are provided in the lengthwise extending beams 76 of the undercarriage 70 and which are not visible in the illustration of FIG. 5. The number of throughholes is smaller than the number of holes 74. The connecting means 71 also encompass a plural number of bolts 73 of which only two are shown in FIG. 5 and which extend through the holes 74 and the throughholes in the lengthwise extending beams 76 of the undercarriage 70. The bolts 73 are secured by means of conventional self-locking nuts (not shown).

When, for example, additional conveying bands or conveying bands of greater length are attached to the outfeed end 57 of the sieve drum 56, the center of gravity of the support frame 66 is displaced in a direction towards the outfeed end 57 of the sieve drum 56. During travel of the sieve device 54, the outfeed end 57 constitutes the rear end and the infeed hopper 60 with the draw bar 68 constitutes the front end of the sieve device 54 to which a towing vehicle such as a tractor or truck or the like is coupled by means of the draw bar 68. Due to the aforementioned shift in the center of gravity, the load is thus reduced which is effective at the drawbar 68 or the towing vehicle. In order to re-establish the desired effective load at the drawbar 68 or the towing vehicle, the wheels of the undercarriage 70 are blocked or braked and the connecting means 71 are temporarily released by disengaging the bolts 73 from the lengthwise extending beams 76 of the undercarriage 70. The drawbar 68 of the support frame 66 is connected to the towing vehicle which is, then, driven to displace the support frame 66 inclusive of the frame members 67 and the rectangular, elongated plates 72 relative to the undercarriage 70 in a forward direction. This relative movement is permitted due to the blocked or braked condition of the wheels of the undercarriage 70 and due to the disengagement of the bolts 73. The rectangular, elongated plates 72 and their pairs of holes 74 are displaced relative to the throughholes present in the lengthwise extending beams 76 of the undercarriage 70. Upon reaching the desired position of the support frame 66 relative to the undercarriage 70 and which position causes the desired effective load to be present at the towing vehicle, the bolts 73 are re-engaged.

While there are shown and described present preferred embodiments of the invention, it is to be distinctly understood that the invention is not limited thereto but may be otherwise variously embodied and practiced within the scope of the following claims wherein:

What I claim is:

1. A mobile material processing machine comprising:

a support frame;

said support frame including lateral, longitudinally extending support frame members;

a wheel-supported undercarriage including lateral, longitudinally extending undercarriage beams;

said wheel-supported undercarriage carrying a tandem axle;

each one of said lateral, longitudinally extending support frame members being disposed on top of respective co-extending undercarriage beams;

each one of said support frame members and each one of said co-extending undercarriage beams being provided with a plurality of holes which are aligned to each other in a direction substantially perpendicular to said support frame and said undercarriage;

bolt means extending through a preselected number of said holes in said perpendicular direction and directly interconnecting said support frame members and said undercarriage beams co-extending therewith; and said bolt means being temporarily releasable for temporarily disconnecting said support frame member and said undercarriage beam co-extending therewith in order to permit relative displacement between said support frame and said undercarriage.

2. The machine as defined in claim 1, wherein:

said support frame members contain, as said plural number of holes, a plural number of series arranged elongate holes; and said undercarriage beam coextending with said support frame member contains, as said plural number of holes, throughholes in a plural number substantially equal to said plural number of series arranged elongate holes.

3. The machine as defined in claim 2, wherein:

said support frame members constitute I-beams having a lower flange disposed on top of said respective undercarriage beams co-extending therewith; and said plural number of series arranged elongate holes being provided in said lower flange of said I-beams.

4. The machine as defined in claim 1, wherein:

said support frame members contain, as said plural number of holes, a lengthwise sequence of holes; and said bolts extend through selected ones of said lengthwise sequence of pairs of holes.

5. The machine as defined in claim 1, further including:

drive means provided at said tandem axle for displacing said undercarriage and thereby said mobile material processing machine.

6. The machine as defined in claim 5, wherein:

said tandem axle supports a pair of wheels; and said drive means including a pair of drive rolls each of which engages a respective wheel of the pair of wheels;

said drive rolls being connected with respective drive shafts; and said drive means including a common drive motor drivingly connected to said drive shafts.

7. The machine as defined in claim 6, wherein:

each one of said drive rolls has a hollow axle keyed to the associated drive shaft; and said hollow axle carrying an engagement body for engaging the respective one of the pair of wheels of the tandem axle.

8. The machine as defined in claim 7, wherein:

said engagement body is made up of a predetermined number of discs fixedly mounted substantially radially at said hollow axle at predetermined mutual axial spacings; and engagement members fixedly mounted at the circumference of the discs and extending substantially parallel to said hollow axle.

9. The machine as defined in claim 6, further including:

gear means;

said gear means drivingly interconnecting said drive shafts and said common drive motor.

10. The machine as defined in claim 9, wherein:

said gear means constitute a worm gear; and said drive shafts contain respective gears which are in mesh with said worm gear.

11. The machine as defined in claim 6, further including:

engagement means connected to said drive shafts for engaging said drive rolls with said wheels and for disengaging said drive rolls from said wheels of said tandem axle.

12. The machine as defined in claim 11, further including:

a prime mover;

said drive means constitute pressure fluid operated drive means drivingly connected to said prime mover;

said common drive motor constituting a pressure fluid operated drive motor;

said engagement means constituting pressure fluid operated piston-cylinder units having pistons which are connected to respective ones of said drive shafts; and a pressure fluid control system for controlling the operation of said pressure fluid operated piston-cylinder units and said hydraulic drive motor.

13. The machine as defined in claim 12, further including:

pivotable levers linked to said support frame and connected to respective ones of said drive shafts; and said pistons of said pressure fluid operated piston-cylinder units being linked to respective ones of said pivotable levers.

14. The machine as defined in claim 12, wherein:

said pressure fluid operated drive means constitute hydraulic drive means;

said hydraulic drive means include a reservoir containing hydraulic oil;

said hydraulic drive means include a hydraulic pump having an input side connected to said reservoir;

said pressure fluid control system constituting a hydraulic control system;

said hydraulic control system containing a 4/3-way valve connected to an output side of said hydraulic pump and to said reservoir;

check valves interconnecting said 4/3-way valve and said double acting piston-cylinder units;

a pressure responsive switch valve interconnecting said 4/3-way valve and said hydraulic drive motor;

said 4/3-way valve assuming a first controlled position in which said output side of said hydraulic pump is connected through the check valves to a first side of said double acting hydraulic piston-cylinder units and in which a second side thereof is connected through said 4/3-way valve to said reservoir, for engaging said drive rolls and said wheels of said undercarriage at a predetermined contact pressure;

said 4/3-way valve assuming a second controlled position in which said hydraulic pump is connected through said pressure responsive switch valve to said hydraulic drive motors and said check valves block the connection to said reservoir, for engaging said drive rolls and said wheels of said undercarriage at a pressure significantly increased above said predetermined contact pressure and driving said drive rolls and thereby said wheels of said undercarriage for displacing the mobile machine; and said 4/3-way valve assuming a third controlled position in which said hydraulic pump is connected through said check valves to said second side of said double acting hydraulic piston-cylinder units and in which said first side thereof is connected through said 4/3-way valve to said reservoir, for releasing said predetermined contact pressure and disengaging said drive rolls from said wheels of said undercarriage.

15. The machine as defined in claim 14, further including:

remote control means for controlling the operation of said hydraulic control means;

said remote control means acting upon said 4/3-way valve;

said remote control means containing fail-safe means for preventing said 4/3-way valve from accidentally assuming said third position and thereby preventing accidental disengagement of said drive rolls from said wheels of said undercarriage.

16. The machine as defined in claim 15, wherein:

said remote control means contain an operating panel for operation by the operator of the machine;

said fail-safe means constituting the combination of a toggle lever and a push button which must both be actuated in order to place said 4/3-way valve into said third position.

17. The machine as defined in claim 14, wherein:

said machine constitutes a comminuting machine for depositing comminuted material at a rear end as viewed in the displacement direction of said comminuting machine under the action of said hydraulic drive rolls;

said undercarriage containing front wheels and rear wheels as viewed in said displacement direction;

said drive rolls are drivingly associated exclusively with said front wheels of said undercarriage; and said gear means constituting self-locking gear means preventing reversal in the rotary direction of said drive shafts and drive rolls.

* * * * *